April 10, 1934.  C. A. CAMPBELL  1,954,039
AIR BRAKE
Filed Nov. 30, 1929   5 Sheets-Sheet 1
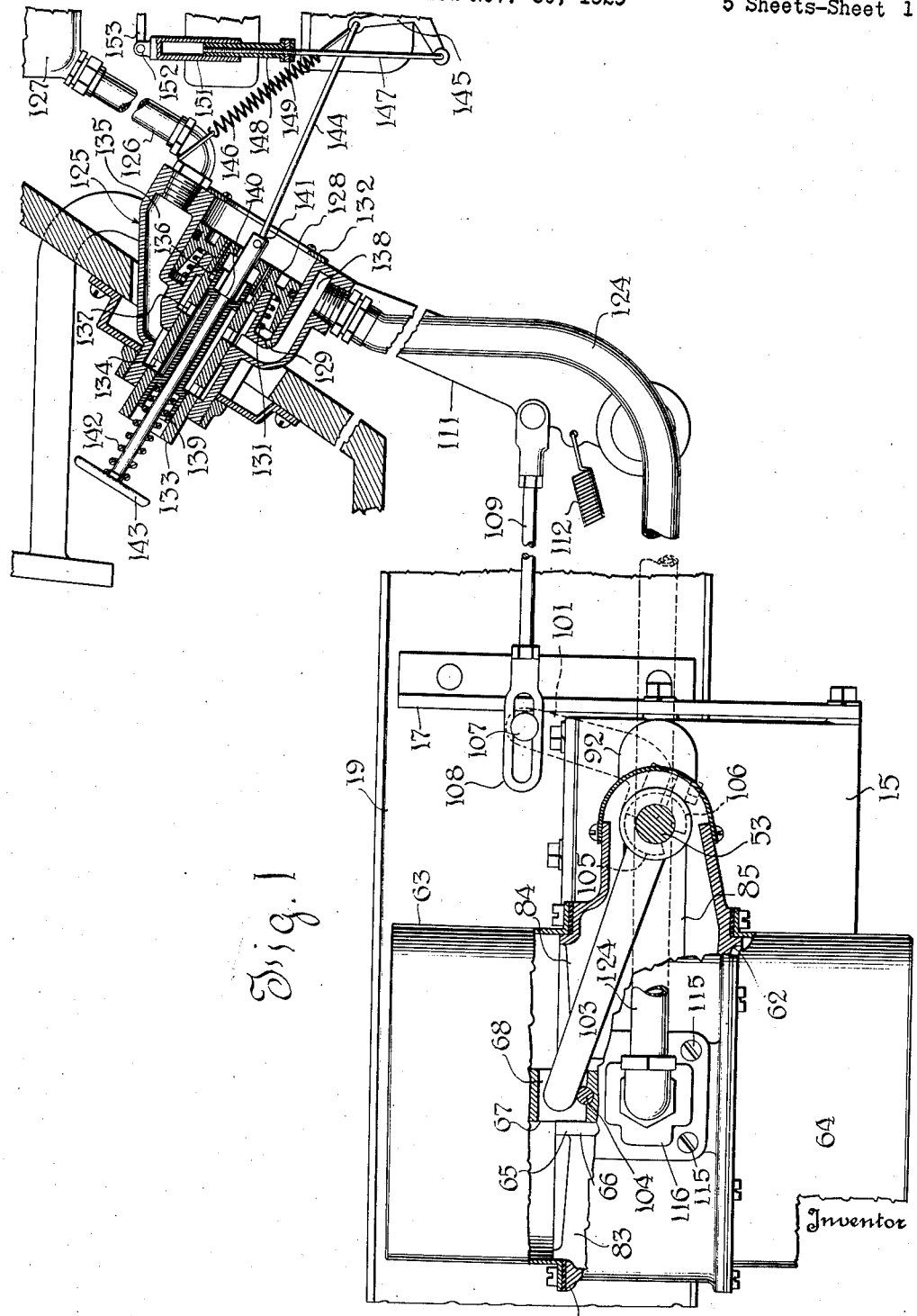
Fig. 1
Inventor
Charles A. Campbell
By  Attorneys

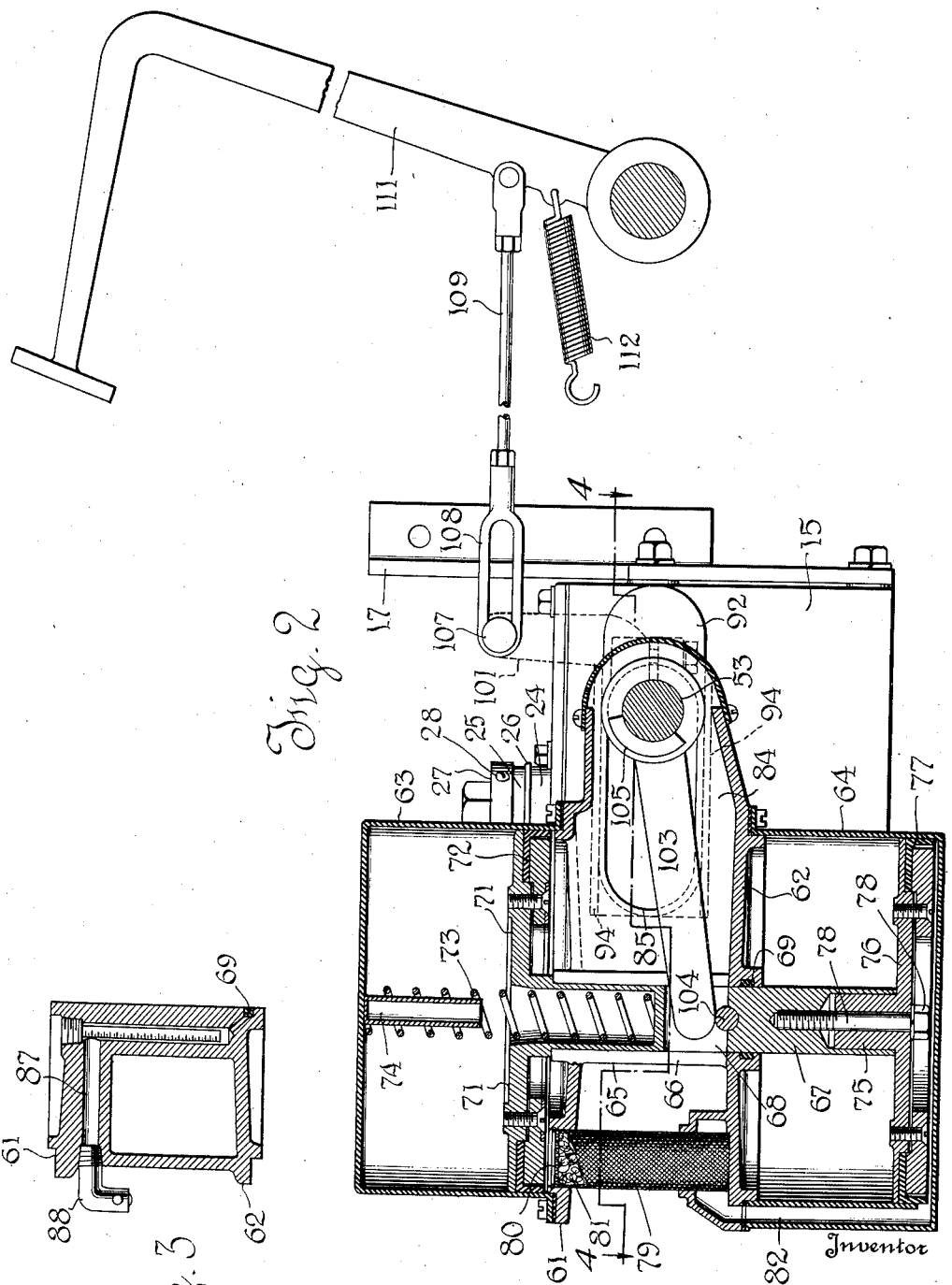

April 10, 1934.    C. A. CAMPBELL    1,954,039
AIR BRAKE
Filed Nov. 30, 1929    5 Sheets-Sheet 3
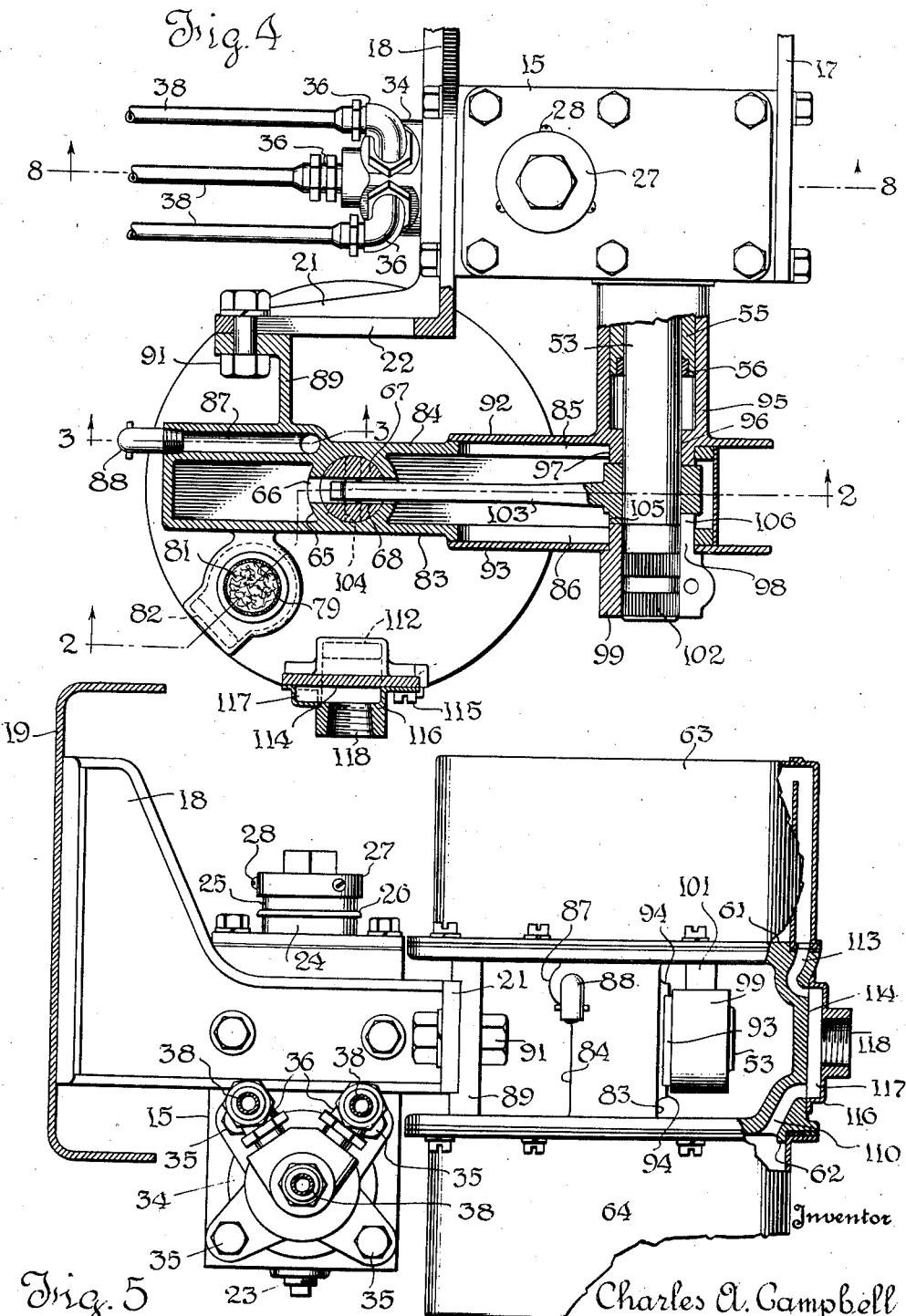
Inventor
Charles A. Campbell
By Dodge and Sons
Attorneys April 10, 1934. C. A. CAMPBELL 1,954,039
AIR BRAKE
Filed Nov. 30, 1929 5 Sheets-Sheet 4

Inventor
Charles A. Campbell
By Dodge and Ims
Attorneys

April 10, 1934.    C. A. CAMPBELL    1,954,039
AIR BRAKE
Filed Nov. 30, 1929    5 Sheets-Sheet 5
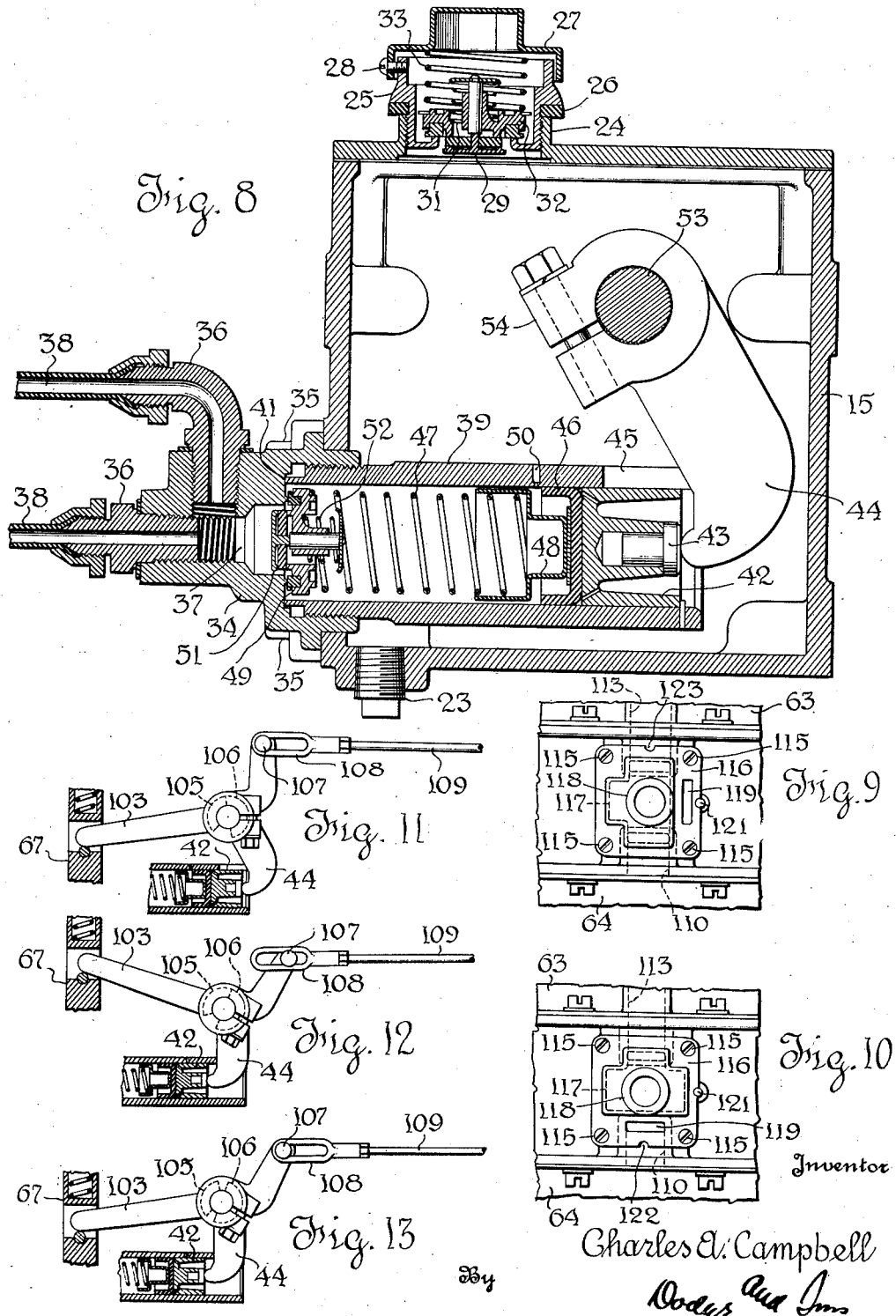
Inventor
Charles A. Campbell
By Dodge and Sons
Attorneys Patented Apr. 10, 1934

1,954,039

UNITED STATES PATENT OFFICE 1,954,039

AIR BRAKE

Charles Albert Campbell, Watertown, N. Y., assignor to The New York Air Brake Company, a corporation of New Jersey Application November 30, 1929, Serial No. 410,785

4 Claims. (Cl. 60—54.6)

This invention relates to fluid pressure brakes, and more particularly, to fluid pressure brakes for automotive vehicles.

In the automotive brake field there has come into quite extensive use a type of brake system ordinarily described as a hydraulic brake. Briefly stated, the identifying characteristics of such a system are a liquid displacing piston pump operated by the brake pedal or some equivalent mechanism, a plurality of expansible chamber motors, at least one for each brake band, and a piping system which connects the displacing piston pump with all of the expansible chamber motors in parallel.

The advantages of such a system are inherent pressure equalization in all of the motors, ability to select motors of different sizes for different brake bands so that the proper relative braking forces may be developed on the front wheels, as contradistinguished from the rear wheels, and freedom from long pull rods, mechanical equalizers, rock shafts and similar parts, which are a common source of noise and trouble.

The demand for braking power commensurate with the high speed and rapid acceleration of modern motor cars has led to the adoption of brake motors of the pneumatic type. Some of these operate above atmospheric pressure and others, the so-called vacuum systems, operate below atmospheric pressure, the latter systems being peculiarly adapted to conventional automobiles because the necessary sub-atmospheric pressures can be derived by connection of the system to the intake manifold of the engine.

In a prior application, Serial No. 298,229, filed August 8, 1928, issued as Patent No. 1,903,978 on April 18, 1933 I have described and claimed a system of the last mentioned type in which a graduating brake valve is so related to the throttle that the throttle and the brake valve are selectively actuated by a single controller, there illustrated as a plunger. This plunger has a neutral position in which the brakes are fully released and in which the engine idles. Motion of the controller in one direction from this neutral position opens the throttle while maintaining the brakes released, and motion of the controller in the opposite direction from the neutral position applies the brakes with a progressively increasing force while maintaining the throttle in idling position.

The controller is spring urged to full application position so that if the operator removes his foot from it the throttle will be automatically closed and the pneumatic brake valve will move automatically to full applying position.

In cases of extreme emergency it is desired to apply the brakes with the full power afforded by the pneumatic applying mechanism and at the same time to supplement the brake pressure through depression of the usual foot actuated foot pedal. The present application illustrates a mechanism which permits this result to be secured. Incidentally it is illustrated as applied to a brake mechanism of the hydraulic type, but it is within the range of mechanical skill to apply it to mechanical brakes, as the hydraulic mechanism, broadly considered, is merely a power transmitting link between a brake actuator and the brake bands.

In the device as installed the controller takes the place of the usual accelerator and it is customary in conventional motor cars to operate the foot brake pedal and the accelerator by the right foot. It will be observed, therefore, that in order to secure a cumulative foot and power application of the brakes, it is merely necessary for the operator to remove his right foot from the controller and use it to depress the foot brake pedal.

It will be understood, of course, that while the particular brake valve illustrated is preferred, some or all of the advantages of the invention may secured with specifically different brake valves.

Another object of the invention is to permit a variation of the mechanical relation of the pneumatic brake applying mechanism to the liquid displacing pump. This variation may be accomplished in either or both of two ways. The first involves a change of leverage and the second involves the use of either one or both of two pneumatic pistons forming a part of the mechanism. In some aspects the invention is not limited to subatmospheric brakes, but is applicable generally to fluid pressure motor actuated brakes. Thus while the invention has been described in considerable detail, and while the embodiment illustrated is believed to have outstanding advantages, certain of the broad principles involved are not limited to the particular structure shown.

The preferred embodiment of the invention is illustrated in the accompanying drawings, in which,—

Fig. 1 is a view partly in side elevation and partly in section, and with certain portions broken away to reduce the size of the figure, showing the foot operated brake pedal, the graduating pneumatic brake valve, the pneumatic connections between the valve, the intake manifold and the brake cylinders, and the mechanical connections between the controller, the throttle and the brake valve. In this view the controller is shown in full applying position and the foot actuated brake pedal in release position.

Fig. 2 is a view similar to Fig. 1, omitting the brake valve and showing the two brake cylinders and pistons in vertical axial section, the section being taken on the line 2—2 of Fig. 4, (release position).

Fig. 3 is a fragmentary section on the line 3—3 of Fig. 4.

Fig. 4 is a plan view of the reservoir and connections forming part of the hydraulic pump, and the vacuum brake cylinder connected thereto, the brake cylinder mechanism being shown in section on the line 4—4 of Fig. 2.

Fig. 5 is a rear elevation of the hydraulic reservoir and connections with the brake cylinder mechanism mounted thereon.

Fig. 8 is a section on the line 8—8 of Fig. 4.

Fig. 9 is a fragmentary view showing the shiftable suction connector in position to render both cylinders operative.

Fig. 10 is a similar view showing the connector assembled to render only the upper brake cylinder operative.

Fig. 11 is a fragmentary diagrammatic view showing the pump plunger, the pneumatic brake pistons and the foot brake reach rod in release position.

Fig. 12 is a similar view showing the pump plunger moved to application position by the pneumatic piston while the foot brake remains in release position.

Fig. 13 is a similar view showing the pump plunger moved to application position by the foot pedal, while the pneumatic brake cylinder remains in release position.

Figure 6:
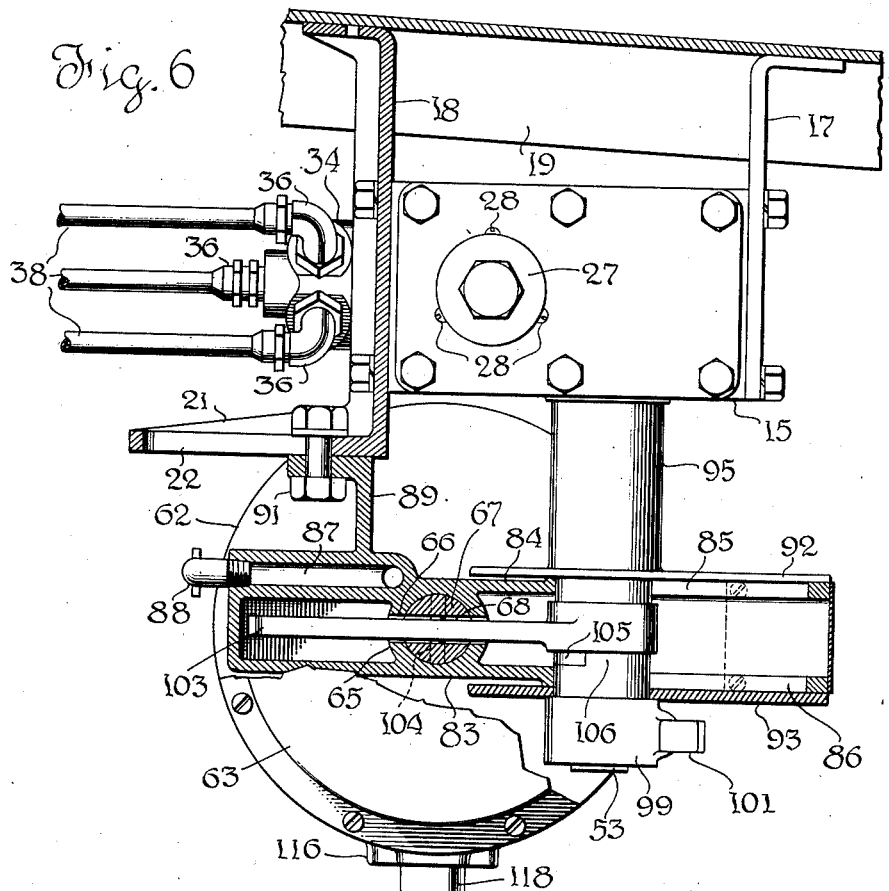
Fig. 6 is a view similar to Fig. 4, but showing a different adjustment of the brake cylinders to a reduced leverage ratio.
Figure 7:
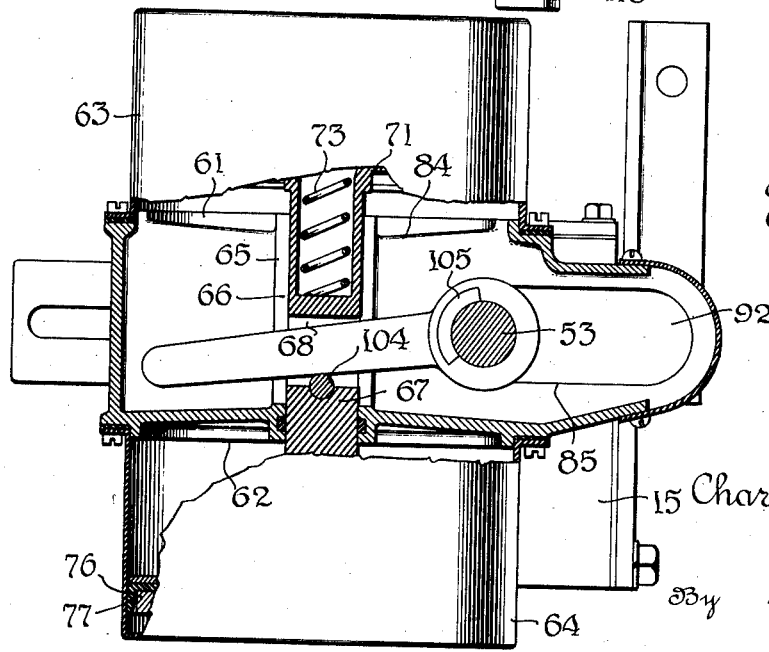
Fig. 7 is a fragmentary view, similar to a portion of Fig. 2, showing the reduced leverage adjustment of Fig. 6.

A standard hydraulic brake mechanism, for which no novelty is here claimed, will first be described with reference to Figs. 4, 5, 6 and 8. The mechanism is enclosed in a combined liquid reservoir and housing 15 which is rigidly supported by brackets 17 and 18 on some part of the frame of the motor vehicle, indicated generally at 19. In the present instance the bracket 18 is of special form extending beyond the reservoir 15 and having a lateral offset 21 provided with a longitudinal slot 22. The reservoir is provided at its bottom with a drain plug 23 and at its top with a filling opening 24 into which a plug 25 fits and is sealed by a gasket 26.

Mounted on the top of the cap 25 is a disk cap 27 which is spaced therefrom and serves as a combined breather and spring seat. It is held in place by a plurality of screws 28, one of which appears in Fig. 8. Mounted in the cap 25 are two reversely seated check valves, one of which, 29, opens inward by overcoming a relatively light spring 31, and the other of which, 32, opens outward against the resistance of a relatively heavy spring 33. The cap 27 serves as a seat for the spring 33.

An opening is formed in the rear wall of the reservoir 15 to receive a combined cylinder head and distributor fitting 34. This is held in place by screws 35 (see Fig. 5) and is provided with a plurality of nipples 36 which communicate with the bore 37 of the head 34 and afford connection to pipes 38 leading to the hydraulic motors which actuate the various brake bands. Three pipes 38 are shown in the drawings. Any suitable number may be used.

Screwed into the cylinder head 34 is the master or pump cylinder 39. This is closely fitted and makes a liquid tight metal to metal joint at 41. Slidable in the cylinder 39 is a piston 42 having a hardened steel insert 43 which receives the thrust of the actuating rock arm 44. Clearance for the motion of the arm 44 is afforded by a slot 45 cut at one end of the cylinder 39 near the top thereof. Piston 42 is sealed by a packing cup 46 and is urged to the right in a brake releasing direction by a spring 47 which reacts against a spring seat 48, and this in turn is in thrust relation with the packing cup and piston.

Interposed between the working space in the cylinder 39 and the bore 37 of the cylinder head 34, is a double check valve. This consists of a large valve 49 which has a seating gasket and which is held seated by the spring 47. Reversely seated on the valve 49 is a similar valve 51 opening in the reverse direction to permit outflow from the cylinder and this valve is urged to its seat by a much lighter spring 52. There is a minute supply port 50 leading from the interior of the reservoir through the wall of the cylinder 39 to the working space in the cylinder. This port is so placed that it will be overtraveled by the piston as soon as this starts its motion in a brake applying direction.

The arm 44 is fixed on a rock shaft 53, the mounting being adjustable by the use of a broached split clamp 54 on the arm 44 in conjunction with a fluted surface on the shaft 53. The shaft 53 is supported in bearings in the walls of the reservoir 15, one bearing taking the form of a projecting sleeve 55 which is provided with an oil retaining felt 56.

This hydraulic brake mechanism is quite familiar to those skilled in the art and its operation is, briefly, as follows:

Assume that the reservoir is filled with oil or other fluid and that the pump cylinder and the pipe lines are charged, the piston 48 being in its right hand, or release, position, as shown in Fig. 8. To apply the brakes the shaft 53 is turned clockwise, forcing the piston 42 to the left and displacing liquid which opens check valve 51 and flows through the pipes 38 to the hydraulic motors on the individual brake bands. It will be understood that the resulting movements of the hydraulic motors, (which are not shown) applies the brakes.

As soon as the piston starts to move, port 50 is blanked so that from then on the pressure fluid is completely trapped. Motion of the piston 42 to the left also draws atmospheric air in through the valve 29 so that on the ensuing release motion of the piston 42 a pressure slightly above atmospheric will be created in the reservoir 15. The purpose of this is to insure the flow of any necessary make-up liquid from port 50 to the working space in the cylinder.

If the pressure in the reservoir 15 becomes too high it will be relieved by the check valve 32. The purpose of the double check valves 49, 51, is to allow free flow from the working space of cylinder 39 to the brake band motors and yet offer sufficient resistance to return flow to make sure that the piping system is kept under slight pressure even when the brakes are released. In this way no lost motion can occur and the brakes commence to apply instantly upon depression of the pedal.

Various other different hydraulic brake mechanisms are known and may be substituted for the one illustrated. As to certain aspects of the invention a mechanical transmitting medium might be substituted for the liquid medium here described without departure from the broad spirit of the invention.

The shaft 53 projects a substantial distance beyond the extension 55. The pneumatic cylinder structure is all supported by a housing, preferably of aluminum, which is of rather complicated form. It terminates top and bottom in what may be described as cylinder heads 61, 62, each having a peripheral flange with a shoulder to receive and position cup shaped cylinders, of which the upper one is indicated at 63 and the lower one at 64. These cylinders are centered by the shoulder and are locked to the flange on the cylinder head by screws, as shown. Gaskets are used to prevent leakage and are indicated on the drawings. The two heads 61, 62, are connected by a central tubular guide member 65 cast integral therewith and slotted at 66 to permit the passage of the brake actuating lever. The tubular member 65 is machined to serve as a guide for the piston rod 67. This rod has a through slot 68 which alines with the slot 66 in the guide. A felt washer is mounted in an annular recess 69 in the guideway and serves to distribute lubricant.

The piston rod 67 is hollow at its upper end and is formed integral with the upper piston head 71 which has a sealing packing cup 72 held to it by a clamping ring, shown in the drawings, and conforming generally to standard practice. One reason for making the upper portion of the rod 67 tubular is to permit extra length of the piston return spring 73 which is partly housed in the hollow piston rod and which is centered at its upper end by a tubular guide member 74 spot welded or otherwise fixed on the upper closed end of the cylinder 63.

The lower end of the piston rod 67 is counterbored to receive a boss or hub 75 on the lower piston head 76. This also has a packing cup, which is indicated at 77, and which is clamped in place in a manner similar to that adopted for the packing cup 72. Piston head 76 is held to the rod 67 by a machine screw 78.

As will be understood later, the piston moves upward to apply the brakes and moves downward to release them. It follows therefore that in a brake cylinder operating at sub-atmospheric pressure, the spaces above the pistons are to be evacuated and the spaces below the pistons are to be subject to atmospheric pressure. To admit atmospheric air to the lower spaces without the admission of grit and dust, a gauze tube 79, filled with curled hair 81, is mounted between the heads 61 and 62 with its ends received in apertures for that purpose. The upper end of the gauze tube 79 is closed by a perforated disk 80 held in place by a snap ring. The upper end of the strainer structure leads directly to the space beneath the piston 71. The lower end leads to the space below the piston 76 by way of a passage 82 formed partly in the casting of the head 62 and partly in the shell of cylinder 64.

Tying the heads 61 and 62 together, and approximately tangent to the tubular wall 65, are a pair of vertical spaced partitions 83 and 84 which serve as housings for the lever mechanism, and which are slotted, as indicated at 85 and 86 to embrace the shaft 53 while permitting the cylinder structure to be moved bodily toward and from the axis of the shaft. The web or partition 84 is formed with a lubricating passage 87 which leads from an ordinary pressure feed connecting nipple 88 to the felt 69 (see Fig. 3). Also extending from the partition 84 is a bracket member 89 which seats against the extension 21 of bracket 18. A bolt 91 passes through the bracket 89 and through the slot 22 in the bracket 21.

As explained, the shaft 53 passes through the elongated openings 85 and 86 and these openings are sealed by plates 92 and 93 which seat against the partitions 83 and 84 and are confined between parallel projecting ribs 94 (see Fig. 2), provided to hold the plates in position. The plate 92 is formed with a tubular extension 95 which swivels on the projecting sleeve 55 and also on the shaft 53, as indicated at 96. There is a circular hub portion 97 which closely fits the slot 85 so that the sleeve, shaft and housing are all positively held centered. The plate 93 has a round aperture 100 which receives a circular extension 98 on the split clamping head 99 of the foot pedal actuated lever 101. This lever 101 is adjustably mounted by clamping it about the fluted end 102 of shaft 53.

Swiveled on the shaft 53 between the hub 97 and the hub 98 is a lever 103 which extends through the slots 66 and 68 so as to be actuated by the piston rod 67 when this moves upward. To reduce the friction a thrust roller 104 is used.

As stated, the lever 103 is swiveled on the shaft 53 and is provided with an arcuate lug 105 which coacts with an arcuate lug 106 on the hub 98 of lever 101. It follows that if piston rod 67 is forced upward it will rotate shaft 53 clockwise through the interengagement of lugs 105, 106, but the shaft 53 may rotate clockwise without requiring upward motion of the piston rod 67.

It will be observed that in Fig. 4 the axis of the cylinders is spaced as far as possible from the axis of shaft 53 giving the maximum leverage, while in Fig. 6 the cylinders are spaced the minimum distance from the axis of the shaft 53 giving the minimum leverage. With the parts proportioned as shown the ratio of leverages is about two to one. It will be observed that in thees two figures the plates 92 and 93 are assembled in reverse positions. This arrangement permits a single set of plates to give the maximum adjustment without requiring the plates to be unduly long, a condition which would result in interference with other parts.

It will be understood, of course, that various intermediate adjustments between those illustrated in Figs. 4 and 6, may be made. Examination of the drawings will show that the plates 92 and 93 will blank the slots 85 and 86 completely if they are reversed at or about the mid-adjustment.

The lever 101 has at its upper end a fulcrum pin 107 which passes through the elongated slot in a clevis 108 attached to the brake pull rod 109. Pull rod 109 is connected to the usual brake foot pedal 111, and a return spring 112 is provided to restore the brake pedal to release position. No support is shown for the other end of the spring 112, but it will be understood that this is necessarily connected to some fixed member.

It will be observed that when the shaft 53 is rocked by the lever 103 the slot in the clevis 108 permits the lever 101 to move without requiring motion of the foot pedal 111. This action is diagrammed in Figs. 11, 12 and 13, in which 11 shows all parts in release position, 12 shows the master piston of the hydraulic brake system shifted by the pneumatic piston while the foot pedal remains in release position, and 13 shows the master piston of the hydraulic piston moved to application position by the foot pedal mechanism while the pneumatic piston remains in release position.

Referring now particularly to Figs. 4, 5, 9 and 10, it will be observed that there is a passage 110 leading to the working space above the lower piston 76, and a passage 113 leading to the working space above the upper piston 71. These two passages terminate in a machined surface 114 formed on a portion of the housing structure which supplies the two pneumatic cylinders. Fastened against these surfaces by four machine screws 115 is a manifold fitting 116 which has a T-shaped cavity 117 to which threaded connection 118 leads.

The member 116 is also provided with a through slot 119. There is a positioning pin 121 which coacts with positioning notches 122 and 123 in the edge of the member 116. If the member 116 is mounted as shown in Fig. 9 the connection 118 is in communication with the working spaces above both pistons and as the connection 118 is the suction connection this renders both brake pistons operative. On the other hand, if the member 116 is assembled as shown in Fig. 10, the connection 118 leads to the space above the upper piston only, and in such event the through opening 119 allows the space above the lower piston to be connected to atmosphere. Under such conditions the spaces above and below the lower piston are at atmospheric pressure so the piston is inoperative to develop any braking action.

It is contemplated that in cases where the leverage adjustment is not sufficient the provision of means for cutting out one of the two cylinders will be found useful. One purpose is to provide a single mechanism which will not only take care of considerable variation in size and weight of cars, but will also afford adjustments suited to the preferences of the driver and the particular driving conditions encountered, it being desirable to reduce the available braking effect when cars are used on snow and ice.

Connected to the connection 118 is the suction line 124. This leads to a brake valve, indicated generally by the numeral 125 applied to its housing. This housing is further connected by the pipe 126 with the intake manifold 127 of any suitable internal combustion engine, such as a gasoline engine.

So far as is necessary for present purposes the valve mechanism includes the following elements: A piston 128, which is subject at its right hand side to atmospheric pressure, and subject on its left hand side to brake cylinder pressure which is admitted to act on the piston through a port 129. The piston is urged outward or to the right by a coil spring 131, which in the right hand position of the piston exerts substantially no pressure thereon and which will just be overpowered by the maximum available suction in manifold 127. The outward motion of the piston is limited by a ring stop 132.

The piston 128 is rigidly connected to a tubular valve seat 133 which is slidable, as the piston 128 moves, in a seat formed in the housing 125 to receive it. This seat 133 has three ports. The first port, 134, is in constant communication through passage 135 and pipe 126 with the manifold 127. In other words, there is always manifold suction pressure in the port 134. There is an exhaust port 136, which is always in communication with atmosphere. The third port, 137, is intermediate the other two, and is always in communication with the brake cylinder by way of passage 138 and pipe 124. It will be understood that the valve seat member 133 makes a gas tight joint with the housing 125.

The port 137 is connected selectively with ports 134 and 136, or disconnected from both according to the position of a spool shaped valve 139. In its intermediate position it has a very slight lap and blanks simultaneously ports 134 and 136, or, if moved slightly in either direction from its midposition it connects the brake cylinder port 137 with one or the other of the two named ports. Connection with 136 releases the brake. Connection with 134 allows air to flow from the brake cylinder to the intake manifold 127 and applies the brake.

It will be observed therefore that the valve 139 moves upward or to the left relatively to Fig. 1 to apply the brake, and that application of the brake is attended by a reduction of the pressure in the brake cylinder and consequently in the passage 138. This reduction is transmitted through the passage 129 to the space to the left of piston 128, so that this piston tends to follow up the valve 139 and lap the same. It follows that for every position in which the valve 139 is set there is a corresponding brake cylinder pressure, and it is possible to graduate the brake cylinder pressure by controlling the position of the valve 139.

The controller takes the form of a plunger 141 which extends through the spool valve 139. In its upward motion it positively engages the spool valve by means of a shoulder 140. In its downward motion it moves the spool valve by means of a spring 142 which is confined between the spool valve 139 and the head or button 143 at the upper end of the plunger.

The plunger 141 is connected by a link 144 with one arm of a bell crank 145 which is urged in a counterclockwise direction by coil spring 146. The other arm of the bell crank 145 is connected to a thrust link 147. This has an adjustable thrust member 148 locked by check nut 149, and engaging the end of a sleeve 151 which is pinned at 152 to the throttle lever 153 of the engine.

The release position of the valve mechanism is with the piston 128 against the stop 132 and the valve 139 as far down as it can move. The parts are so dimensioned that when the valve is in release position and the shoulder 140 on the plunger 141 is still in engagement with the valve 139, the adjustable thrust member 148 has just moved to a point to pick up the sleeve 151. This is the neutral point in which the brakes are released and the throttle is in idling position. It follows that if the button 143 be further depressed the spring 142 will yield but will hold the valve 139 in release position. The downward motion of the plunger 141 will move the throttle lever 153 in an opening direction. On the return motion the throttle lever 153 will come to rest in its idling position just as the shoulder 140 on the plunger 141 is about to pick up the valve 139. Upon continued upward motion of the button 143 the plunger 141 will move the valve 139 in a brake-applying direction. It thus becomes possible to control the car as to brake and throttle by merely shifting the member 143.

The brake valve above described and the controlling mechanism for the throttle and brake valve is not claimed herein, but forms the subject matter of my prior application above identified.

Throughout the braking range the effect is to establish a varying pressure above the pistons 71 and 76 or above the piston 71 alone if the piston 76 be rendered inoperative as described. If the operator removes his foot from the button 143 the spring 146 will shift the plunger 141 to full application position, which is the position shown in Fig. 1, and thus the brakes will be applied with the full force offered by the vacuum mechanism. The depression of the brake pedal 111 will result in increased brake application because, as will be readily understood from a consideration of Figs. 11 to 13, the effect of the brake pedal is cumulative with respect to the effect of the pneumatic brake cylinders.

The construction above described has many advantages. In the first place, it is a true power brake as contradistinguished from the so-called "booster" brakes which merely help the operator to depress the ordinary foot pedal. The foot pedal, however, is always available for independent operation, so that the brakes may be applied by foot power alone if the vacuum mechanism fail for any cause, or may be applied by both agencies concurrently at any time when the vacuum mechanism is operative.

The lever mechanism with the ratio adjustable in the proportion of two to one and the provision for the use of one or two cylinders, allows a range of approximately four to one in the effective brake force. This is more than ample to meet all contingencies.

The pneumatic motor mechanism is mounted directly on the hydraulic pump mechanism so that lost motion is avoided and so that the whole mechanism may be protected from dirt. A particular advantage of the hydraulic mechanism is that it, and consequently the pneumatic cylinders, may be mounted close to the motor. This is an important point because the reduction in the length of the pipe connections from the intake manifold to the brake cylinder eliminates the time lag which would be introduced by restricted flow through long passages.

The chief advantage in subjecting the throttle and the brake to actuation by a single controller is the elimination of the delay incident to shifting the foot from the accelerator to the brake pedal, as is necessary in conventional brake installations, not excepting those making use of the so-called "booster". Consequently the elimination of any time lag in the response of the pneumatic mechanism is a factor vital to the success of the system as a whole.

Various possible substitutions have been suggested in general terms, and others may be made. The scope of the invention is defined solely by the following claims.

What is claimed is,—

1. In a brake for vehicles, the combination of a brake-applying mechanism including a rock shaft; a slotted housing embracing and slidable transversely to said shaft; means for supporting said housing in different adjusted positions; members mounted on said shaft and serving to close the slots in the housing in the various adjusted positions of the latter; a lever mounted on said shaft within said housing; and an expansible chamber motor supported on said housing and having a piston rod in driving engagement with said lever, the parts being so arranged that the piston rod and housing are enclosed and protected.

2. In a brake for vehicles, the combination of a brake-applying mechanism including a rock shaft; a slotted housing embracing and slidable transversely to said shaft; means for supporting said housing in different adjusted positions; members mounted on said shaft and serving to close the slots in the housing in the various adjusted positions of the latter; a lever mounted on said shaft within said housing; and two expansible chamber motors mounted on opposite sides of said housing and having a common piston rod extending through the housing and there engaging said lever.

3. In a brake for vehicles, the combination of a brake-applying mechanism including a rock shaft; a slotted housing embracing and slidable transversely to said shaft; means for supporting said housing in different adjusted positions; members mounted on said shaft and serving to close the slots in the housing in the various adjusted positions of the latter; a lever mounted on said shaft within said housing; two expansible chamber motors mounted on opposite sides of said housing and having a common piston rod extending through the housing and there engaging said lever; and means for rendering one or both of said motors operative.

4. The combination of liquid displacing means suited for use with a hydraulic brake system, said mechanism having an actuating shaft; a sleeve encircling said shaft and having a projecting web transverse to the shaft; a slotted housing guided transversely to said shaft by said sleeve, a slot in the housing being closed by said web; a bracket connected with the reservoir and pump structure for sustaining said housing in different adjusted positions; a lever mounted on said shaft within said housing; and an expansible chamber motor mounted on said housing and having a piston rod in driving engagement with said lever.

CHARLES ALBERT CAMPBELL.